(12) United States Patent
Tokura et al.

(10) Patent No.: US 8,179,106 B2
(45) Date of Patent: May 15, 2012

(54) DC-DC CONVERTER

(75) Inventors: Norihito Tokura, Okazaki (JP); Hisato Kato, Nagoya (JP); Norikazu Kanatake, Okazaki (JP); Masakiyo Horie, Gamagori (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 12/585,123

(22) Filed: Sep. 3, 2009

(65) Prior Publication Data

US 2010/0060254 A1  Mar. 11, 2010

(30) Foreign Application Priority Data

Sep. 4, 2008  (JP) .................................. 2008-227530
Aug. 28, 2009  (JP) .................................. 2009-198538

(51) Int. Cl.
*G05F 1/613* (2006.01)
(52) U.S. Cl. ........................ 323/224; 323/283; 323/284
(58) Field of Classification Search .................. 323/224, 323/283, 284
See application file for complete search history.

(56) References Cited

U.S. PATENT DOCUMENTS

| 4,801,859 | A | * | 1/1989 | Dishner ........................ 323/224 |
| 6,028,755 | A | | 2/2000 | Saeki et al. |
| 6,420,858 | B1 | | 7/2002 | Kitagawa et al. |

FOREIGN PATENT DOCUMENTS

| JP | A-03-218264 | 9/1991 |
| JP | A-06-113542 | 4/1994 |
| JP | A-07-099775 | 4/1995 |
| JP | A-2001-161068 | 6/2001 |
| JP | A-2002-272093 | 9/2002 |
| JP | A-2005-073460 | 3/2005 |
| JP | A-2006-149128 | 6/2006 |
| JP | A-2006-325287 | 11/2006 |
| JP | A-2007-129853 | 5/2007 |
| JP | A-2007-151271 | 6/2007 |
| JP | A-2007-185050 | 7/2007 |
| JP | A-2008-141894 | 6/2008 |
| JP | A-2009-124052 | 6/2009 |

OTHER PUBLICATIONS

Office Action issued from the Japanese Patent Office on Aug. 17, 2010 in the corresponding Japanese patent application No. 2009-198538 (with English translation).

* cited by examiner

*Primary Examiner* — Shawn Riley
(74) *Attorney, Agent, or Firm* — Posz Law Group, PLC (57) ABSTRACT

A synchronous-rectifier type DC-DC converter includes a high-side main switch element, a low-side rectifying switch element, and a control drive circuit. The rectifying switch element includes a rectifying transistor element and a rectifying diode element connected in antiparallel with the rectifying transistor element. The control drive circuit detects an input voltage to the main switch element and determines the input voltage or a rate of increase in the input voltage. When the determined value exceeds a predetermined reference value, a complementary ON/OFF operation of the main switch element and the rectifying transistor element is released, and a state where both the main switch element and the rectifying transistor element are kept OFF for a time period that is longer than a dead-time during the complementary ON/OFF operation is set.

21 Claims, 9 Drawing Sheets

DC-DC CONVERTER

CROSS REFERENCE TO RELATED APPLICATION

This application is based on and incorporates herein by reference Japanese Patent Application No. 2008-227530 filed on Sep. 4, 2008 and No. 2009-198538 filed on Aug. 28, 2009.

FIELD OF THE INVENTION

The present invention relates to DC-DC converters for supplying a stable DC power to various types of electronic devices and, in particular, a DC-DC converter adaptable to electronic devices mounted on a vehicle.

BACKGROUND OF THE INVENTION

DC-DC converters for supplying a stable DC power to various types of electronic devices can be classified roughly into a chopper type DC-DC converter without a synchronous rectifier and a synchronous-rectifier type DC-DC converter with a synchronous rectifier.

In a chopper type DC-DC converter, a DC power on a primary side is intermittently supplied to a coil by operation of a switching element, and a stepped up or down DC output is obtained on a secondary side by using magnetic energy stored in the coil.

Figure 9:
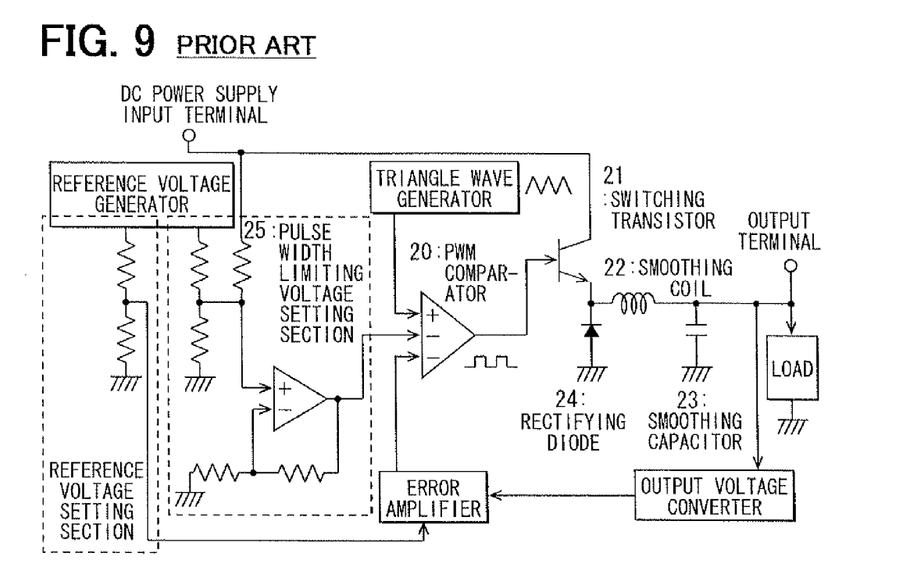
FIG. 9 is a circuit diagram of a conventional DC-DC converter.

FIG. 9 is an example of a chopper type DC-DC converter and illustrates a diagram of a DC-DC converter that is disclosed in JP-A-2001-161068 and has a supply power limiting function.

The chopper type DC-DC converter shown in FIG. 9 mainly includes a switching transistor (switching element) 21, a smoothing coil 22, a smoothing capacitor 23, and a rectifying diode 24. Further, the DC-DC converter includes a PWM comparator 20 and a pulse width limiting voltage setting section 25. An output voltage of the pulse width limiting voltage setting section 25 changes depending on high/low of an input power supply voltage.

In the DC-DC converter shown in FIG. 9, the output voltage of the pulse width limiting voltage setting section 25 becomes high when the input power supply voltage becomes high, and the output voltage of the pulse width limiting voltage setting section 25 becomes low when the input power supply voltage becomes low. In this way, the output voltage of the pulse width limiting voltage setting section 25 serves as a function to limit a maximum value of a time period (pulse width of a switching pulse), where the PWM comparator 20 outputs a voltage during one cycle of a triangle wave output voltage, to or below a limit width that changes depending on the input power supply voltage.

In contrast, a synchronous-rectifier type DC-DC converter employs a synchronous rectifier instead of a rectifying diode of a chopper type DC-DC converter.

Figure 10:
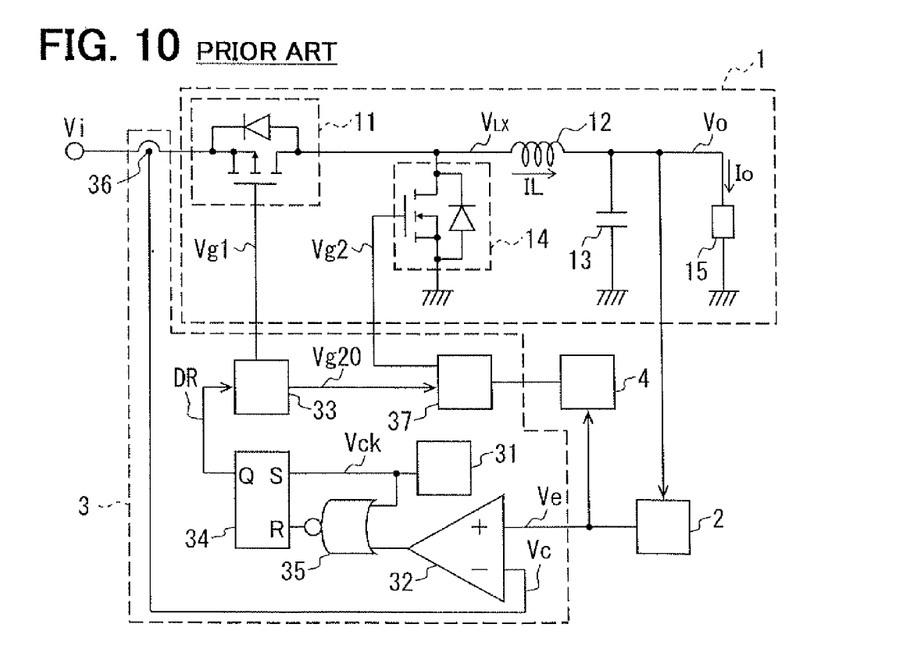
FIG. 10 is a circuit diagram of another conventional DC-DC converter.

FIG. 10 is an example of a synchronous-rectifier type DC-DC converter and illustrates a circuit diagram of a DC-DC converter disclosed in JP-A-2007-151271.

The DC-DC converter shown in FIG. 10 includes a chopper circuit 1, an error amplifier (output error detection circuit) 2, a control drive circuit (control section) 3, and a voltage detection circuit (voltage detection section) 4.

The chopper circuit 1 includes a main switch element (first switch) 11 that performs an ON/OFF operation in response to a signal inputted to a control terminal, an inductor 12 that repeats charge and discharge of magnetic energy according to the ON/OFF operation of the main switch element 11, a smoothing capacitor 13 that smoothes an electric current flowing through the inductor 12, and a rectifying switch element (second switch) 14 that performs an ON/OFF operation complementary to the ON/OFF operation of the main switch element 11. An input DC voltage Vi is applied to the main switch element 11, and an output DC voltage Vo is outputted from the smoothing capacitor 13 to a load 15. When switching, there is a dead-time during which neither the main switch element 11 nor the rectifying switch element 14 is ON. An antiparallel diode is added to each of the main switch element 11 of p-channel and the rectifying switch element 14 of n-channel. The diode is a body diode that is formed at the same time as a MOS transistor is formed to a semiconductor substrate. A typical synchronous-rectifier type DC-DC converter is configured such that the body diode does not operate.

In the DC-DC converter shown in FIG. 10, the error amplifier (output error detection circuit) 2 detects the output DC voltage Vo and generates an error signal Ve by amplifying a difference between the output DC voltage Vo and a target value. The voltage detection circuit 4 detects the error signal Ve outputted by the error amplifier 2 and outputs a detection signal depending on a difference between the error signal Ve and a target detection level. The control drive circuit 3 includes a current detection circuit 36 that generates a current detection signal Vc depending on an electric current of the main switch element 11, a comparison circuit 32, an oscillation circuit 31 that generates a clock signal Vck having a predetermined switching frequency and pulse width, a NOR gate 35, a latch circuit 34 that generates a drive signal DR, a drive circuit 33 that generates a first drive signal Vg1 for driving the main switch element 11, and a dead-time adjustment circuit 37 that generates a signal Vg20 and a second drive signal Vg2. The signal Vg20 has a logic level opposite to that of the first drive signal Vg1 and has a dead-time set to a minimum value. The signal Vg2 has a dead-time that is adjusted depending on the signal Vg20 and the detection signal from the voltage detection circuit 4. The dead-time of the signal Vg2 is a period of time from when the main switch element is turned OFF to when the rectifying switch element 14 is turned ON.

In comparison with the chopper type DC-DC converter shown in FIG. 9, the synchronous-rectifier type DC-DC converter shown in FIG. 10 can generally achieve a high conversion efficiency by shortening the dead-time during which neither the high-side main switch element 11 nor the low-side rectifying switch element 14 is ON.

Further, the DC-DC converter shown in FIG. 10 is configured by the dead-time adjustment circuit 37 in such a manner that a dead-time of the rectifying switch element 14 becomes longer as the output DC voltage Vo becomes larger. As a result, an increase in the output DC voltage Vo can be reduced.

However, even in the DC-DC converter shown in FIG. 10, for example, like in the case of a load dump that is a surge (abnormal voltage) specific to a vehicle, when a sudden increase in an input voltage occurs or a high input voltage is continuously applied for a long time, it is difficult to control the dead-time because operation characteristics of the switch elements 11, 14 change. Therefore, there may be a possibility that the two switch elements 11, 14 will be simultaneously turned ON and broken by a flow-through current.

SUMMARY OF THE INVENTION

In view of the above, it is an object of the present invention to provide a synchronous-rectifier type DC-DC converter that can have a high conversion efficiency and supply a stable DC power without element breakdown even when a sudden input voltage increase such as a vehicle load dump occurs or an input voltage remains high for a long time.

According to an aspect of the present invention, a synchronous-rectifier type DC-DC converter includes a high-side main switch element, a low-side rectifying switch element, and a control drive circuit. The rectifying switch element includes a rectifying transistor element and a rectifying diode element connected in antiparallel with the rectifying transistor element. The control drive circuit controls an ON/OFF state of the main switch element and the rectifying transistor element. The control drive circuit detects an input voltage to the main switch element and determines the input voltage or a rate of increase in the input voltage. When the determined value exceeds a predetermined reference value, a complementary ON/OFF operation of the main switch element and the rectifying transistor element is released, and a state where both the main switch element and the rectifying transistor element are kept OFF for a time period that is longer than a dead-time during the complementary ON/OFF operation is set.

The DC-DC converter includes the high-side main switch element and the rectifying switch element including the low-side rectifying transistor element and the rectifying diode element connected in antiparallel with the rectifying transistor element. In normal operation, the high-side main switch element and the low-side rectifying transistor element are controlled by the control drive circuit so as to perform the complementary ON/OFF operation. Therefore, in normal operation, the DC-DC converter performs a so-called synchronous-rectifier type operation.

In contrast, the DC-DC converter detects an input voltage Vi to the main switch element, and the control drive circuit determines the input voltage Vi or a rate dVi/dt of increase in the input voltage. When the determined value exceeds the predetermined reference value, the complementary ON/OFF operation of the main switch element and the rectifying transistor element is released, and the state, where both the main switch element and the rectifying transistor element are kept OFF for a time period that is longer than the dead-time during the complementary ON/OFF operation, is set. Here, it is noted that the rectifying diode element is connected in antiparallel with the rectifying transistor element Therefore, even when both the main switch element and the rectifying transistor element are kept OFF for a time period that is longer than the dead-time during the complementary ON/OFF operation, power supply can be continued by causing the rectifying diode element to perform a free wheel operation In other words, when both the main switch element and the rectifying transistor element are kept OFF for a time period that is longer than the dead-time during the complementary ON/OFF operation, the DC-DC converter serves as a chopper type DC-DC converter.

In this way, the DC-DC converter can be a synchronous-rectifier type DC-DC converter that can have a high conversion efficiency and supply a stable DC power without element breakdown even when a sudden input voltage increase such as a vehicle load dump occurs or an input voltage remains high for a long time.

According to the DC-DC converter, it is preferable that the complementary ON/OFF operation of the main switch element and the rectifying transistor element be released by evaluating both the input voltage and the rate of increase in the input voltage, not any one of the input voltage and the rate of increase in the input voltage. In such an approach, more reliable control can be achieved, for example, when a sudden input voltage increase such as a vehicle load dump occurs or when an input voltage remains high for a long time.

According to the DC-DC converter, it is preferable that the rectifying transistor element is continuously kept OFF under a condition where the determined value exceeds the reference value. In such an approach, the DC-DC converter can perfectly serve as a chopper type DC-DC converter during the input voltage abnormal condition where the determined value exceeds the reference value. Thus, element breakdown can be more surely prevented.

Further, according to in the DC-DC converter, under the condition where the determined value exceeds the reference value, a pulse width of an ON-signal for the rectifying transistor element can be unchanged from before the release, and a repetition cycle of the ON-signal for the rectifying transistor element can be slower than before the release.

In this case, during the input voltage abnormal condition where the determined value exceeds the reference value, the rectifying diode element plays a primary role in rectifying operation, and the rectifying transistor element plays a secondary role. Therefore, both preventing element breakdown and supplying a suitable DC power can be achieved by suitably setting the repetition cycle of the ON-signal for the rectifying transistor element with respect to an input voltage Vi or a rate dVi/dt of increase in the input voltage during expected abnormal condition.

According to the DC-DC converter, under the condition where the determined value exceeds the reference value, it is preferable that a pulse width of an ON-signal for the main switch element be unchanged from before the release, and a repetition cycle of the ON-signal for the main switch element be slower than before the release.

In such an approach, during the input voltage abnormal condition where the determined value exceeds the reference value, the operation of the main switch element can be more stabilized, and the dead-time can be controlled more easily even when the rectifying transistor element is used in a secondary manner.

Further, according to the DC-DC converter, under the condition where the determined value exceeds the reference value, it is preferable that a switching speed of each of the main switch element and the rectifying transistor element be smaller than before the release. In such an approach, during the input voltage abnormal condition where the determined value exceeds the reference value, overshoot (ringing) in the main switch element and the rectifying transistor element caused by a sudden voltage increase can be prevented.

According to the DC-DC converter, the input voltage or the rate of increase in the input voltage can be determined by a software computing of a digital circuit. Further, the input voltage or the rate of increase in the input voltage can be determined by an electronic circuit.

According to the DC-DC converter, it is preferable that the rectifying diode element be a Schottky barrier diode having a low forward voltage.

In a case where the rectifying transistor element is a MOS transistor element, the rectifying diode element can be a body diode element that is formed to the same semiconductor substrate as the MOS transistor element. In such an approach, the DC-DC converter can be reduced in size and cost. In the DC-DC converter that uses the body diode inherent in the rectifying transistor element as the rectifying diode element, since the body diode element operates at low speed, what need to be done is to control the main switch element, and there is no need to perform subtle dead-time control. Therefore, it is easy to avoid breakdown of an element and a load due to a flow-through current caused from a shortage of a dead time and to avoid occurrence of a surge and a malfunction caused from an excess of a dead time.

In this case, it is preferable that an electric current flowing through the main switch element be detected in the DC-DC converter. In such an approach, even when a low-speed body diode element is used, the operation of the main switch element and the rectifying transistor element can be controlled after surely detecting that there is no residual surge current.

According to the DC-DC converter, it is preferable that the main switch element and the rectifying switch element be formed to the same SOI (Silicon On Insulator) substrate. In such an approach, as compared to where the main switch element and the rectifying switch element are formed to a bulk monocrystalline silicon substrate, the main switch element and the rectifying switch element including the rectifying transistor element and the rectifying diode element can be increased in speed and reduced in loss.

In this way, the DC-DC converter is configured as a synchronous-rectifier type DC-DC converter that can have a high conversion efficiency and supply a stable DC power without element breakdown even when a sudden input voltage increase occurs or an input voltage remains high for a long time.

Therefore, the DC-DC converter is suitable for use in a vehicle. In particular, by setting the reference value with respect to a load dump surge, the DC-DC converter can supply a stable DC power without element breakdown even when a sudden input voltage increase such as a vehicle load dump occurs or an input voltage remains high for a long time.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

Embodiments of the present invention are described below with reference to the drawings.

Figure 1A:
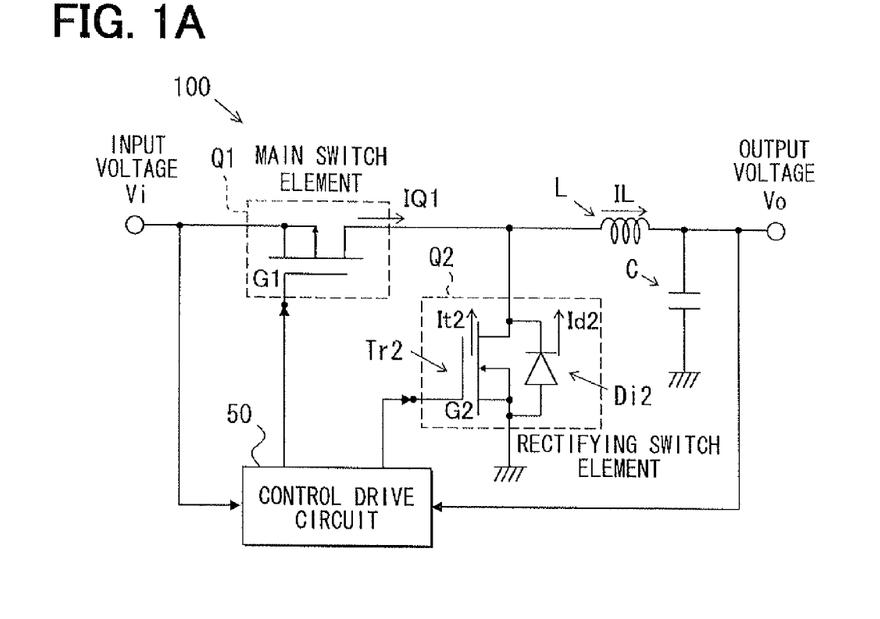
FIG. 1A is a circuit diagram illustrating a main portion of a DC-DC converter according to a first embodiment of the present invention.
Figure 1B:
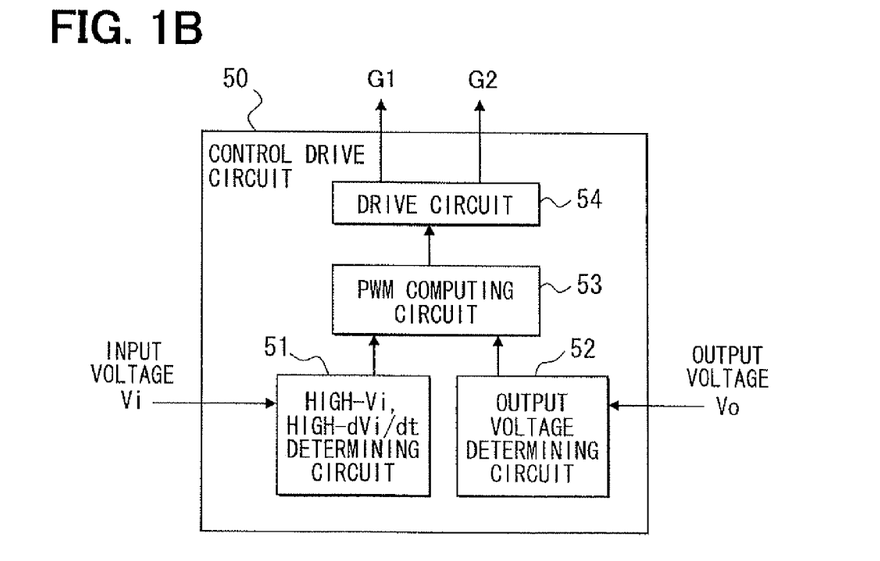
FIG. 1B is a circuit diagram of a control drive circuit of the DC-DC converter of FIG. 1B.

FIG. 1A is a circuit diagram illustrating a main portion of a DC-DC converter 100 according to a first embodiment of the present invention, and FIG. 1B is a circuit diagram illustrating a detail view of a control drive circuit 50 shown in FIG. 1A.

The DC-DC converter 100 shown in FIG. 1A is a DC-DC converter for use in a vehicle. As described in detail below, the DC-DC converter 100 is configured to supply a stable DC power without element breakdown, in particular, even when a sudden input voltage increase dVi/dt such as a load dump occurs or an input voltage Vi remains high for a long time.

The DC-DC converter 100 shown in FIG. 1A is a synchronous-rectifier type DC-DC converter including a high-side main switch element Q1 and a low-side rectifying switch element Q2, which are enclosed by broken lines in the drawing. The high-side main switch element Q1 is formed with a p-channel MOS transistor element and performs an ON/OFF operation in response to a signal G1 inputted to a control terminal. An inductor L repeats charge and discharge of magnetic energy according to the ON/OFF operation of the main switch element Q1. A smoothing capacitor C smoothes an electric current IL flowing through the inductor L. The low-side rectifying switch element Q2 of the DC-DC converter 100 includes a rectifying transistor element Tr2 that performs an ON/OFF operation complementary to the ON/OFF operation of the main switch element Q1. Unlike a typical synchronous-rectifier type DC-DC converter, the low-side rectifying switch element Q2 includes a rectifying diode element Di2 that is connected in antiparallel with the rectifying transistor element Tr2. In the DC-DC converter 100 shown in FIG. 1A, the rectifying transistor element Tr2 is formed with a n-channel MOS transistor element, and the rectifying diode element Di2 is formed with an external Schottky barrier diode element.

As shown in FIG. 1A, the DC-DC converter 100 includes a control drive circuit 50 for controlling an ON/OFF state of the main switch element Q1 and the rectifying transistor element Tr2. In the DC-DC converter 100, the control drive circuit 50 detects an input voltage Vi to the main switch element Q1 and an output voltage Vo of the smoothing capacitor C and outputs optimum gate signals G1, G2 to the main switch element Q1 and the rectifying transistor element Tr2, respectively.

As shown in FIG. 1B, the control drive circuit 50 includes a high-Vi, high-dVi/dt determining circuit 51, an output voltage determining circuit 52, a PWM computing circuit 53, and a drive circuit 54. The high-Vi, high-dVi/dt determining circuit 51 determines whether the input voltage Vi is in normal condition or in abnormal condition where the input voltage Vi or a rate dVi/dt of increase in the input voltage Vi exceeds a predetermined reference value. The output voltage determining circuit 52 determines whether the output voltage Vo is stable. Based on a result of the determination of the input voltage Vi by the high-Vi, high-dVi/dt determining circuit 51 and a result of the determination of the output voltage Vo by the output voltage determining circuit 52, the PWM computing circuit 53 executes predetermined computations so that the gate signals G1, G2 can be outputted through the drive circuit 54 to the main switch element Q1 and the rectifying transistor element Tr2, respectively.

In the DC-DC converter 100, as described in detail later, the control drive circuit 50 detects the input voltage Vi to the main switch element Q1 and determines the input voltage Vi or the rate dVi/dt of increase in the input voltage Vi. When the determined value exceeds the predetermined reference value, the complementary ON/OFF operation of the main switch element Q1 and the rectifying transistor element Tr2 is released, and a state, where both the main switch element Q1 and the rectifying transistor element Tr2 are kept OFF for a time period that is longer than a dead-time during the complementary ON/OFF operation, is set.

Figure 2:
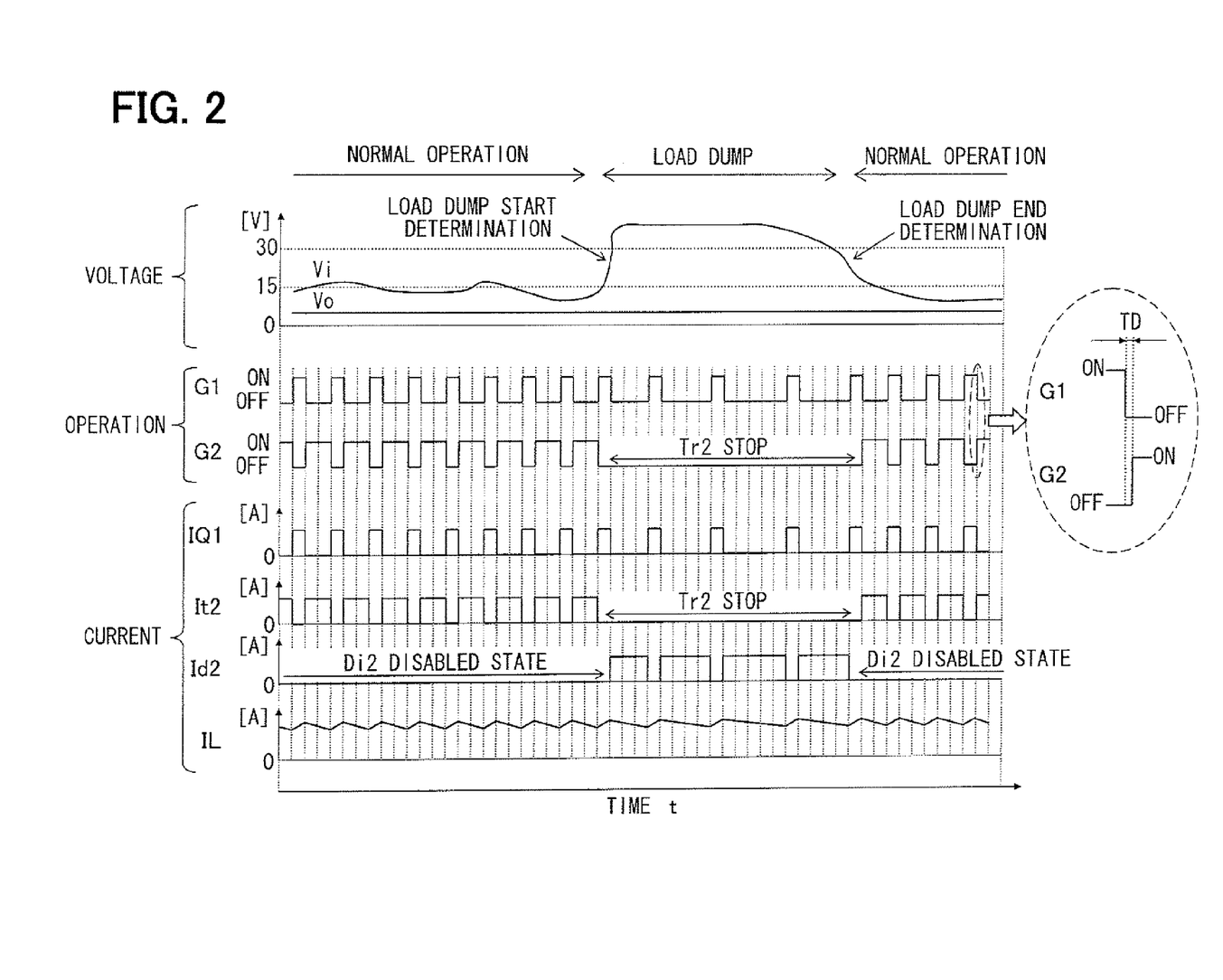
FIG. 2 is a timing chart of the DC-DC converter of FIG. 1A.

FIG. 2 is a timing chart explaining an example of operation of the DC-DC converter 100 shown in FIG. 1A. In FIG. 2, the input voltage Vi, the output voltage Vo, the gate signal G1 for the main switch element Q1, the gate signal G2 for the rectifying transistor element Tr2, an electric current IQ1 flowing through the main switch element Q1, an electric current It2 flowing through the rectifying transistor element Tr2, an electric current Id2 flowing through the rectifying diode element Di2, and the electric current IL flowing through the inductor L are represented by using the same time axis.

As described previously, the DC-DC converter 100 includes the high-side main switch element Q1 and the rectifying switch element Q2 that includes the low-side rectifying transistor element Tr2 and the rectifying diode element Di2 connected in antiparallel with the rectifying transistor element Tr2. As shown in FIG. 2, in normal operation, the high-side main switch element Q1 and the low-side rectifying transistor element Tr2 are controlled by the control drive circuit 50 so as to perform the complementary ON/OFF operation. Therefore, in normal operation, the DC-DC converter 100 performs a so-called synchronous-rectifier type operation in which the high-side main switch element Q1 and the low-side rectifying transistor element Tr2 are repeatedly turned ON and OFF in a complementary manner under a predetermined dead-time control. Thus, PWM operation is performed with a high degree of efficiency so that a stable DC voltage can be outputted. It is noted that the rectifying diode element Di2 is disabled in normal operation where the high-side main switch element Q1 and the low-side rectifying transistor element Tr2 perform the complementary ON/OFF operation.

As described previously, in the DC-DC converter 100, the input voltage Vi to the main switch element Q1 is detected. As described later, the control drive circuit 50 determines the input voltage Vi or the rate dVi/dt of increase in the input voltage Vi. Then, when the determined value exceeds the predetermined reference value, as shown in FIG. 2, the complementary ON/OFF operation of the main switch element Q1 and the rectifying transistor element Tr2 is released, and a state, where both the main switch element Q1 and the rectifying transistor element Tr2 are kept OFF for a time period that is longer than a dead-time TD during the complementary ON/OFF operation, is set. In the time chart of FIG. 2, the rectifying transistor element Tr2 is perfectly stopped upon determination of start of a load dump and continuously kept OFF while the load dump lasts.

According to the DC-DC converter 100 shown in FIG. 1A, unlike a conventional synchronous-rectifier type DC-DC converter, the rectifying diode element Dig is connected in antiparallel with the rectifying transistor element Tr2. Therefore, even when both the main switch element Q1 and the rectifying transistor element Tr2 are kept OFF for a time period that is longer than the dead-time TD during the complementary ON/OFF operation, power supply can be continued as shown in FIG. 2 by causing the rectifying diode element Dig to perform a free wheel operation. In other words, when both the main switch element Q1 and the rectifying transistor element Tr2 are kept OFF for a time period that is longer than the dead-time TD during the complementary ON/OFF operation, the DC-DC converter serves as a chopper type DC-DC converter.

In this way, the DC-DC converter 100 shown in FIG. 1A is configured as a synchronous-rectifier type DC-DC converter that can have a high conversion efficiency and supply a stable DC power without element breakdown even when a sudden input voltage increase occurs or an input voltage remains high for a long time.

Next, operation of the high-Vi, high-dVi/dt determining circuit 51 of the control drive circuit 50 shown in FIG. 1B is described in detail.

Figure 3A:
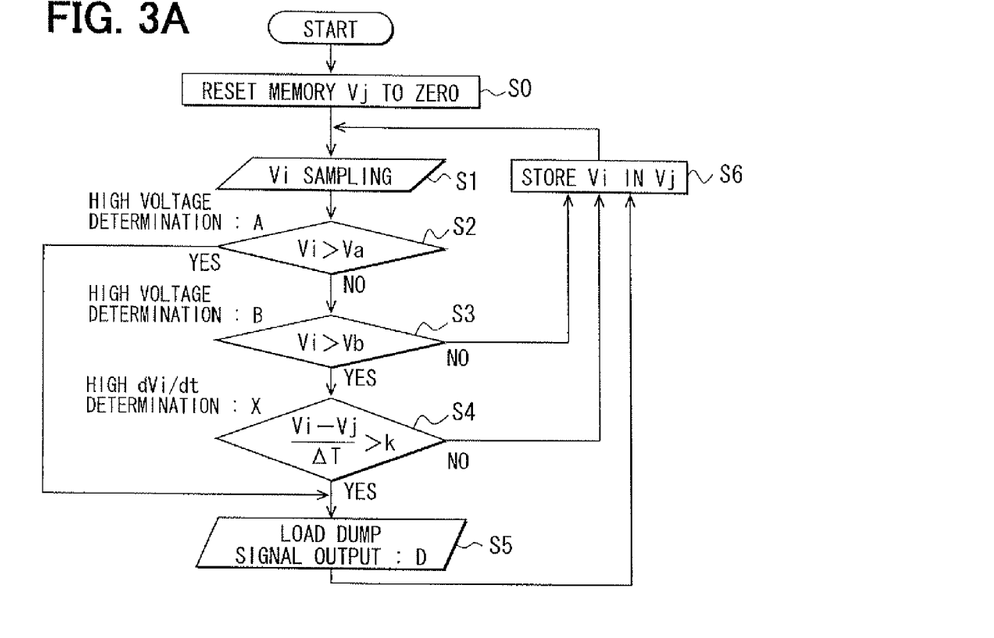
FIG. 3A is a flow chart of a high-Vi, high-dVi/dt determining circuit.
Figure 3B:
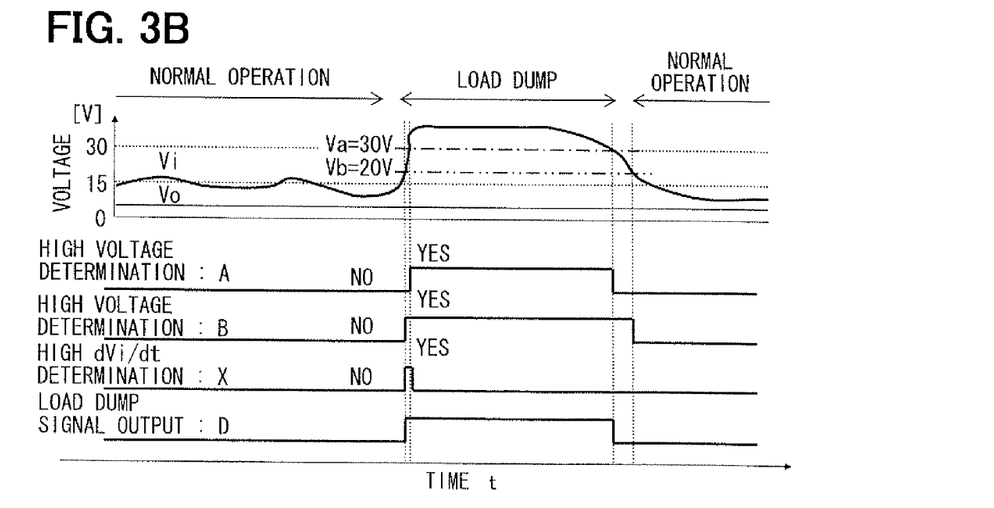
FIG. 3B is a timing chart of the high-Vi, high-dVi/dt determining circuit.

FIGS. 3A, 3B are diagrams illustrating the high-Vi, high-dVi/dt determining circuit 51 configured by a software computing of a digital circuit. FIG. 3A is a flow chart of the software computing, and FIG. 3B is a timing chart illustrating a determination operation.

The high-Vi, high-dVi/dt determining circuit 51 shown by the flow chart in FIG. 3A operates in the following manner. Firstly, at step S0, a memory Vj is reset to zero. Then, at step S1, the input voltage Vi is sampled. It is noted that a sampling period $\Delta T$ is short enough to follow a sudden change in the input voltage Vi during a load dump.

Next, at step S2, a high voltage determination A is performed to determine whether the input voltage Vi is in load dump condition by comparing the input voltage Vi with a reference value Va (e.g., 30V). If Vi>Va, the input voltage Vi is determined as being in load dump condition (YES). If Vi<Va, the input voltage Vi is determined as being in non-load dump condition (NO). When the input voltage Vi is determined as being in load dump condition (YES), a load dump signal is outputted at step S5. When the input voltage Vi is determined as being in non-load dump condition (NO), the next step S3 is proceeded to.

At the next step S3, a high voltage determination B is performed by using a reference value Vb (e.g., 20V) lower than the reference value Va. The input voltage Vi is compared with the reference value Vb to determine whether the input voltage Vi is in approximate load dump condition. If Vi>Va, the input voltage Vi is determined as being in approximate load dump condition (YES). If Vi<Va, the input voltage Vi is determined as being in non-approximate load dump condition (NO). When the input voltage Vi is determined as being in approximate load dump condition (YES), the next step S4 is proceeded to. When the input voltage Vi is determined as being in non-approximate load dump condition (NO), the input voltage Vi is stored in the memory Vj at step S6.

When the input voltage Vi is greater than the reference value Vb, a high dVi/dt determination is performed at step S4. At step S4, a change $(Vi-Vj)/\Delta T$ in the input voltage Vi with respect to time is calculated and compared with a reference value k (e.g., 1V/μsec). If $(Vi-Vj)/\Delta T>k$, the input voltage Vi is determined as being in load dump entry condition (YES). If $(Vi-Vj)/\Delta T<k$, the input voltage Vi is determined as being in load dump non-entry condition (NO). When the input voltage Vi is determined as being in load dump entry condition (YES), the next step S5 is proceeded to. When the input voltage Vi is determined as being in load dump non-entry condition (NO), the input voltage Vi is stored in the memory Vj.

When the input voltage Vin is determined as being in load dump condition at step S2 or determined as being in load dump entry condition at step S4, a load dump signal output D is performed at step S5 so that the load dump signal can be outputted. After the load dump signal is outputted, the input voltage Vi is stored in the memory Vj.

After the input voltage Vi is stored in the memory Vj at step S6, the above steps are repeated by returning to step S1.

FIG. 3B is a timing chart illustrating the input voltage Vi, the output voltage Vo, and output signals at each step of the flow chart in FIG. 3A by using the same time axis in a case where a load dump surge enters the input voltage Vi.

When the load dump surge enters the input voltage Vi, the input voltage Vi exceeds the reference value Vb and firstly determined as being in approximate load dump condition by the high voltage determination B at step S3. Then, the input voltage Vi is determined as being in load dump entry condition by the high dVi/dt determination X at step S4, and the load dump signal rises by the load dump signal output D at step S5. While the input voltage Vi remains high due to the load dump, the input voltage Vi is determined as being in load dump condition by the high voltage determination A at step S2, so that the load dump signal is kept outputted. Then, when the input voltage Vi due to the load dump decreases below the reference value Va, the input voltage Vi is determined as being in non-load dump condition, so that the output of the load dump signal at S5 is stopped.

Figure 4A:
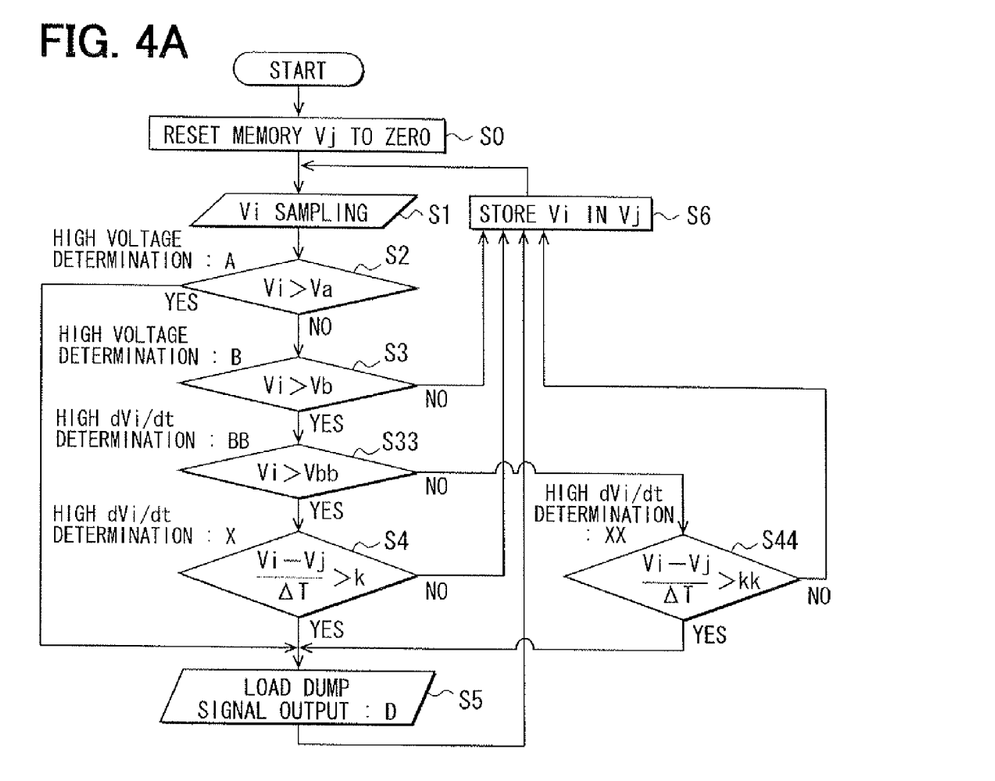
FIG. 4A is a flow chart according to a modification of the high-Vi, high-dVi/dt determining circuit of FIG. 3A.
Figure 4B:
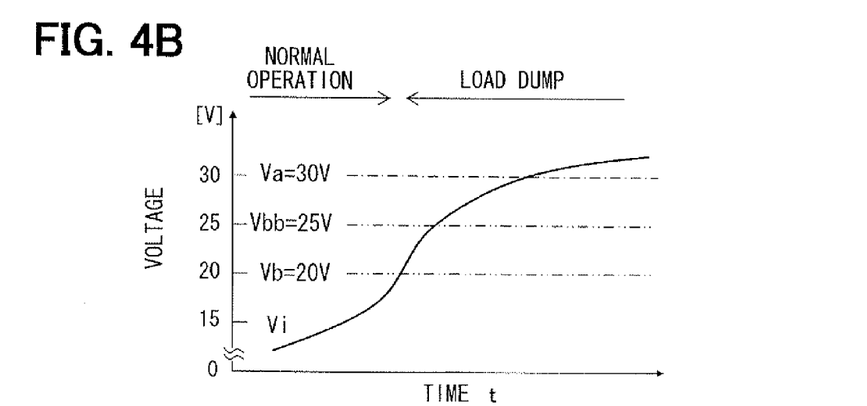
FIG. 4B is a diagram illustrating a change in an input voltage Vi with respect to time at the time of occurrence of a load dump.

FIGS. 4A, 4B illustrate a modification of the software computing shown in FIGS. 3A, 3B. FIG. 4A is a flow chart, and FIG. 4B is a diagram illustrating an example of a change in the input voltage Vi with respect to time at the time of occurrence of the load dump.

As compared to the flow chart shown in FIG. 3A, the flow chart shown in FIG. 4A includes two additional steps: a high voltage determination BB at step S33 and a high dVi/dt determination XX at step S44. A reference value Vbb of the high voltage determination BB at step S33 has an intermediate value (e.g., 25V) between the reference value Va (e.g., 30V) at step S2 and the reference value Vb (e.g., 20V) at step S3. A reference value kk of the high dVi/dt determination XX at step S44 has a value (e.g., 2V/μsec) greater than the reference value k (e.g., 1V/μsec) at step S4.

In the flow chart shown in FIG. 4A, if Vi<Va=30V so that the input voltage Vi is determined as being in non-load dump condition (NO) at step S2, and Vi>Vb=20V so that the input voltage Vi is determined as being in approximate load dump condition (YES) at step S3, the next step S33 is proceeded to.

At step S33, the high voltage determination BB is performed by using the reference value Vbb=25V that is intermediate between the reference value Va=30V and the reference value Vb=20V. If the input voltage Vi>Vbb=25V at step S33, the high dVi/dt determination X is performed at step S4. When (Vi−Vj)/ΔT>k=1V/μsec, the input voltage Vi is determined as being in load dump entry condition (YES) so that step S5 can be proceeded to. In contrast, if the input voltage Vi<Vbb=25V at step S33, the high dVi/dt determination XX is performed at step S44. When (Vi−Vj)/ΔT>kk=2V/μsec, the input voltage Vi is determined as being in load dump entry condition (YES) so that step S5 can be proceeded to.

As compared to in the flow chart shown in FIG. 3A, in the flow chart shown in FIG. 4A, the change (Vi−Vj)/ΔT in the input voltage Vi with respect to time between the reference value Vb=20V and the reference value Va=30V is determined in more detail. That is, between the reference value Vb=20V and the reference value Vbb=25V, the input voltage Vin is determined as being in load dump entry condition (YES), when (Vi−Vj)/ΔT>kk=2V/μsec. Between the reference value Vbb=25V and the reference value Va=30V, the input voltage Vin is determined as being in load dump entry condition (YES), when (Vi−Vj)/ΔT>kk=1V/μsec.

As exemplified in FIG. 4B, the change in the input voltage Vi with respect to time at the time of occurrence of the load dump is generally not constant, and (Vi−Vj)/ΔT does not generally have a constant value. For example, in FIG. 4B, a saturation tendency can be seen from the fact that a slope of the input voltage Vi between the reference value Vb=20V and the reference value Vbb=25V is smaller than a slope of the input voltage Vi between the reference value Vbb=25V and the reference value Va=30V. In such a case, since the flow chart in FIG. 3A has only two reference values Va, Vb for the input voltage Vin and one reference value k for the change (Vi−Vj)/ΔT in the input voltage Vi with respect to time, it is difficult to accurately determine the load dump entry condition. In contrast, according to the flow chart in FIG. 4A, the load dump entry condition can be more accurately determined by suitably setting the reference value Vbb for the input voltage Vin and the reference value kk for the change (Vi−Vj)/ΔT in the input voltage Vi with respect to time. In FIG. 4A, the reference value kk=2V/μsec for the change (Vi−Vj)/ΔT in the input voltage Vi with respect to time at step S44 is greater than the reference value k=1V/μsec at step S4. Alternatively, for more accurate determination, the reference value kk at step S44 can be smaller than the reference value k at step S4 depending on a tendency of the change in the input voltage Vi with respect to time during the load dump.

Figure 5:
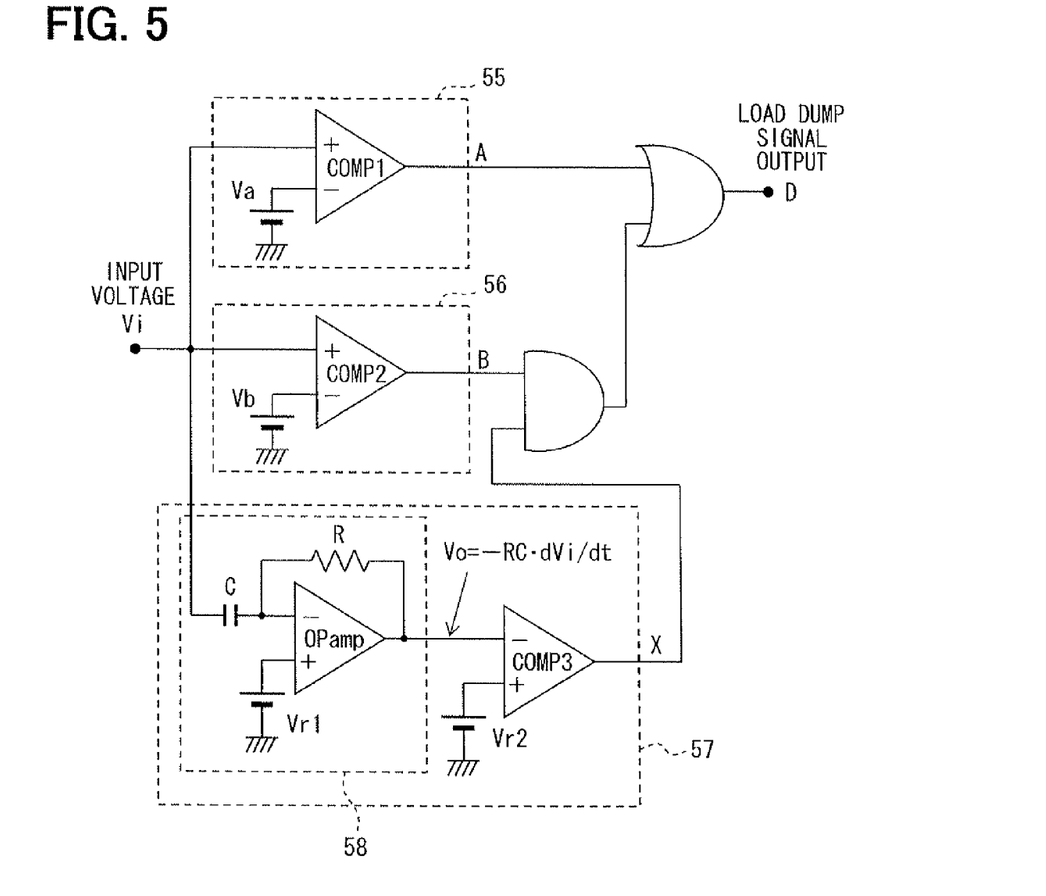
FIG. 5 is a circuit diagram of a high-Vi, high-dVi/dt determining circuit configured as an electronic circuit.

As shown in FIG. 5, the high-Vi, high-dVi/dt determining circuit 51 shown in FIG. 1B can be configured by an electronic circuit.

The electronic circuit shown in FIG. 5 can perform the same determination operation as the high-Vi, high-dVi/dt determining circuit 51 configured by the software computing of the digital circuit shown in FIGS. 3A, 3B. That is, a high voltage determining circuit 55 is formed with a comparator COMP1 and a comparison power supply of a reference value Va (e.g., 30V). When the input voltage Vi>the reference value Va, the input voltage Vin is determined as being in load dump condition, and a terminal A output is asserted. Further, a high voltage determining circuit 56 is formed with a comparator COMP2 and a comparison power supply of a reference value Vb (e.g., 20V). When the input voltage Vi>the reference value Vb, the input voltage Vin is determined as being in approximate load dump condition, and a terminal B output is asserted. Furthermore, a high dVi/dt determining circuit 57 is formed with a differentiating circuit 58 and a comparator COMP5. By suitably setting a resistor R, a capacitor C, and reference voltages Vr1, Vr2, the input voltage Vin is determined as being in load dump entry condition, and a terminal X output is asserted, when dVi/dt>1V/μsec, for example. A load dump signal is outputted to a terminal D by AND operation between the terminal B output and the terminal X output and OR operation with the terminal A output.

In this way, the high-Vi, high-dVi/dt determining circuit 51 configured by the electronic circuit shown in FIG. 5 can perform the same determination operation as the high-Vi, high-dVi/dt determining circuit 51 configured by the software computing of the digital circuit shown in FIGS. 3A, 3B.

Figure 6A:
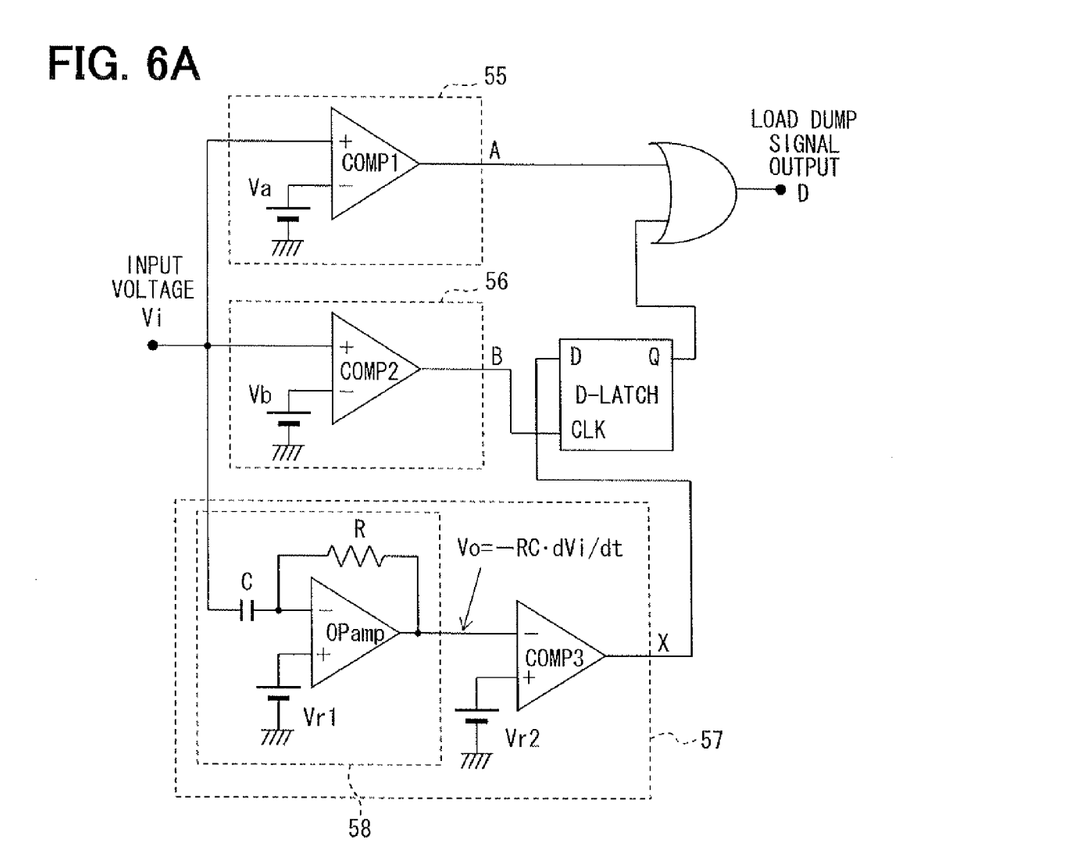
FIG. 6A is a circuit diagram according to a modification of the electronic circuit of FIG. 5.
Figure 6B:
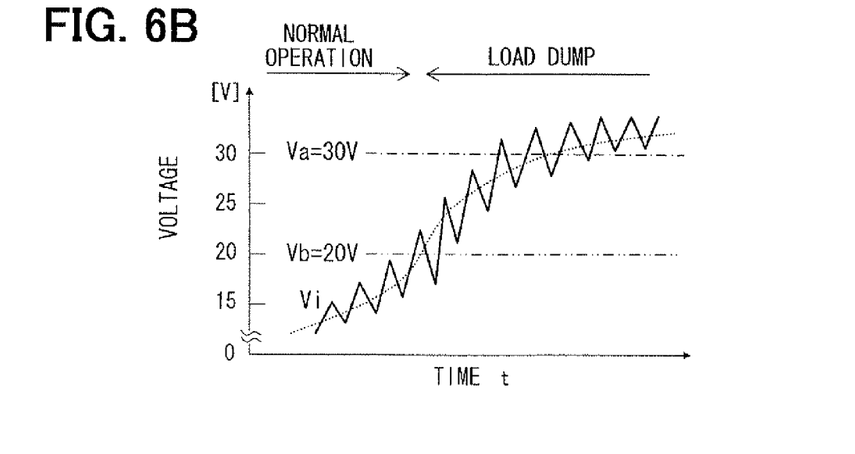
FIG. 6B is a diagram illustrating a change in an input voltage Vi with respect to time at the time of occurrence of a load dump.

FIG. 6A is a circuit diagram according to a modification of the electronic circuit of FIG. 5, and FIG. 6B is a diagram illustrating a change in an input voltage Vi with respect to time at the time of occurrence of a load dump.

In the electronic circuit shown in FIG. 6A, a D-latch operation between a terminal B output and a terminal X output is used instead of the AND operation between the terminal B output and the terminal X output in the electronic circuit shown in FIG. 5. In the electronic circuit shown in FIG. 5, the AND operation between the terminal B output and the terminal X output is performed. Therefore, the input voltage Vi is determined as being in load dump condition, when the input voltage Vi>the reference value Vb=20V and the dVi/dt>the reference value 1V/μsec are satisfied at the same time, for example, under a condition where the input voltage Vi<the reference value Va=30V. However, as exemplified in FIG. 6B, during the load dump, noise overlaps an average input voltage Vi represented by a broken line, and consequently the input voltage Vi may rise while swinging up and down. In this case, according to the electronic circuit shown in FIG. 5, even when the input voltage Vi>the reference value Vb=20V in FIG. 6B, the input voltage Vi is not determined as being in load dump condition in a range where the dVi/dt is negative. In contrast, according to the electronic circuit shown in FIG. 6A, the input voltage Vi is determined as being in load dump condition and stored, when a condition that the input voltage Vi>the reference value Vb=20V is satisfied once, and another condition that the dVi/dt>the reference value 1V/µsec is satisfied while the condition remains satisfied. Therefore, the load dump entry condition can be determined more accurately.

According to the DC-DC converter 100 shown in FIG. 1A, it is preferable that the complementary ON/OFF operation of the main switch element Q1 and the rectifying transistor element Tr2 be released by evaluating both the input voltage Vi and the rate dVi/dt of increase in the input voltage as exemplified in FIGS. 3A, 3B and 5, not any one of the input voltage Vi and the rate dVi/dt of increase in the input voltage. In such an approach, more reliable control can be achieved, for example, when a sudden input voltage increase dVi/dt such as a vehicle load dump occurs or when the input voltage Vi remains high for a long time.

According to the DC-DC converter 100 shown in FIG. 1A, it is preferable that the rectifying transistor element Tr2 be continuously kept OFF as shown in FIG. 2 under a condition where a determined value of the input voltage Vi or the rate dVi/dt of increase in the input voltage exceeds the reference value. In such an approach, the DC-DC converter 100 can perfectly serve as a chopper type DC-DC converter during the input voltage abnormal condition where the determined value exceeds the reference value. Thus, element breakdown can be surely prevented.

Alternatively, according to in the DC-DC converter 100 shown in FIG. 1A, under the condition where the determined value exceeds the reference value, a pulse width of an ON-signal for the rectifying transistor element Tr2 can be unchanged from before the release, and a repetition cycle of the ON-signal for the rectifying transistor element Tr2 can be slower than before the release. In this case, during the input voltage abnormal condition where the determined value exceeds the reference value, the rectifying diode element Di2 plays a primary role in rectifying operation, and the rectifying transistor element Tr2 plays a secondary role. Therefore, both preventing element breakdown and supplying a suitable DC power can be achieved by suitably setting the repetition cycle of the ON-signal for the rectifying transistor element Tr2 with respect to the input voltage Vi or the rate dVi/dt of increase in the input voltage during expected abnormal condition.

According to the DC-DC converter 100 shown in FIG. 1A, under the condition where the determined value exceeds the reference value, a pulse width of an ON-signal for the main switch element Q1 is unchanged from before the release, and a repetition cycle of the ON-signal for the main switch element Q1 is slower than before the release, as can been seen from a period after load dump start determination in FIG. 2. In such an approach, during the input voltage abnormal condition where the determined value exceeds the reference value, the operation of the main switch element Q1 can be more stabilized, and the dead-time can be controlled more easily even when the rectifying transistor element Tr2 is used in a secondary manner.

Further, according to the DC-DC converter 100 shown in FIG. 1A, under the condition where the determined value exceeds the reference value, it is preferable that a switching speed of each of the main switch element Q1 and the rectifying transistor element Tr2 be smaller than before the release. In such an approach, during the input voltage abnormal condition where the determined value exceeds the reference value, overshoot (ringing) in the main switch element Q1 and the rectifying transistor element Tr2 caused by a sudden voltage increase can be prevented.

According to the DC-DC converter 100 shown in FIG. 1A, it is preferable that the rectifying diode element Di2 be a Schottky barrier diode having a low forward voltage.

Alternatively, in a case where the rectifying transistor element is a MOS transistor element, the rectifying diode element can be a body diode element that is formed to the same semiconductor substrate as the MOS transistor element. In such an approach, the DC-DC converter can be reduced in size and cost.

Figure 7A:
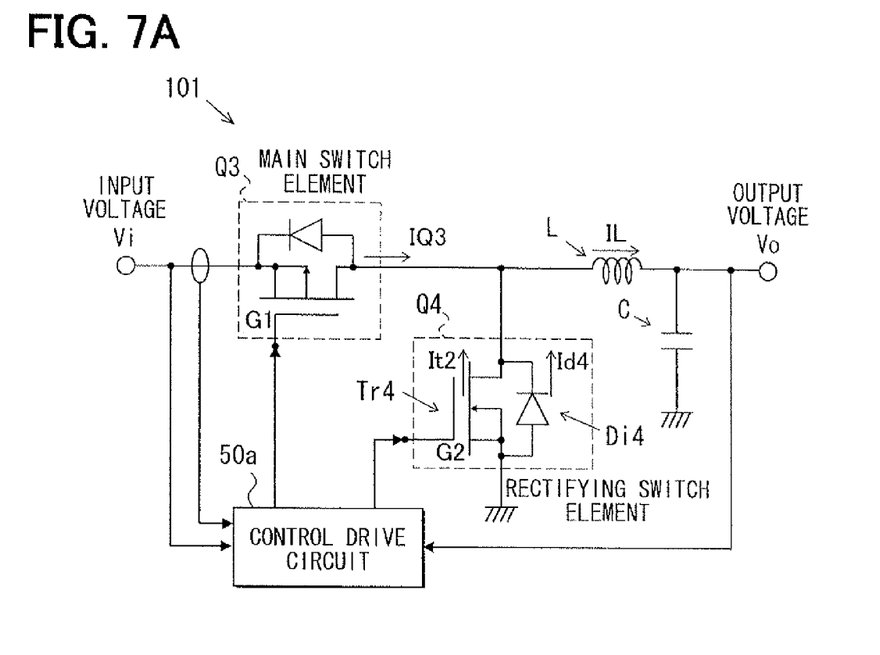
FIG. 7A is a circuit diagram illustrating a main portion of a DC-DC converter according to a second embodiment of the present invention.
Figure 7B:
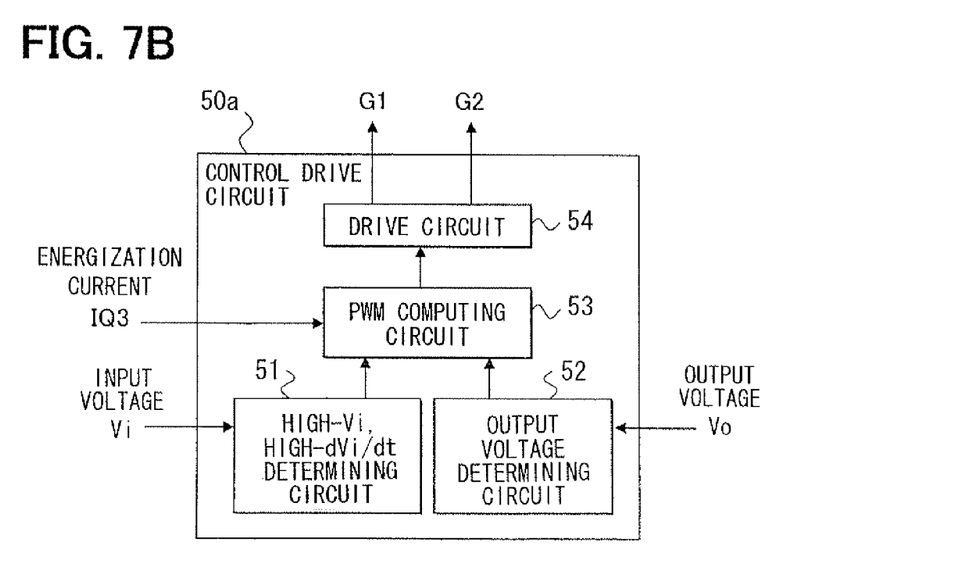
FIG. 7B is a circuit diagram of a control drive circuit of the DC-DC converter of FIG. 7A.

FIGS. 7A, 7B are diagrams illustrating an example of a DC-DC converter in which a body diode formed at the same time as a MOS transistor element is used as the rectifying diode element. FIG. 7A is a circuit diagram illustrating a main portion of a DC-DC converter 101 according to a second embodiment of the present invention, and FIG. 7B is a circuit diagram of a control drive circuit 50a shown in FIG. 7A.

Like the DC-DC converter 100 shown in FIG. 1A, the DC-DC converter 101 shown in FIG. 7A is a synchronous-rectifier type DC-DC converter including a high-side main switch element Q3 and a low-side rectifying switch element Q4. The low-side rectifying switch element Q4 includes a rectifying transistor element Tr4 and a rectifying diode element Di4. The rectifying transistor element Tr4 performs an ON/OFF operation complementary to the ON/OFF operation of the main switch element Q3, and the rectifying diode element Di4 is connected in antiparallel with the rectifying transistor element Tr4. In contrast, unlike the DC-DC converter 100 shown in FIG. 1A, the rectifying diode element Di4 of the DC-DC converter 101 shown in FIG. 7A is a body diode element that is formed at the same time to the same substrate as the rectifying transistor element Tr4 that is an n-channel MOS transistor element. Like the rectifying diode element Dig of the DC-DC converter 100 of FIG. 1A, the rectifying diode element Di4 of the DC-DC converter 101 of FIG. 7A is caused by the control drive circuit 50a to perform a free wheel operation, when both the main switch element Q3 and the rectifying transistor element Tr4 are turned OFF during abnormal condition such as a load dump. It is noted that although the main switch element Q3 is a p-channel MOS transistor element with a antiparalell body diode element, the body diode element of the main switch element Q3 is disabled not to operate.

In the DC-DC converter 101 that uses the body diode inherent in the rectifying transistor element Tr4 as the rectifying diode element Di4, since the body diode element operates at low speed, what need to be done is to control the main switch element Q3, and there is no need to perform subtle dead-time control. Therefore, it is easy to avoid breakdown of an element and a load due to a flow-through current caused from a shortage of a dead time and to avoid occurrence of a surge and a malfunction caused from an excess of a dead time.

According to the DC-DC converter 101 that uses the body diode inherent in the rectifying transistor element Tr4 as the rectifying diode element Di4, it is preferable that an electric current flowing through the main switch element Q3 be detected as shown in FIG. 7A. In such an approach, even when the low-speed body diode element is used as the rectifying diode element Di4, the operation of the main switch element Q3 and the rectifying transistor element Tr4 can be controlled after surely detecting that there is no residual surge current. In particular, a gate control of the rectifying transistor element Tr4 is performed so that an electric current sampling during the input voltage abnormal condition can be performed after a waiting time that allows a surge current due to the body diode inherent in the n-channel MOS transistor to disappear, thereby further stabilizing operation.

According to the DC-DC converters 100, 101 shown in FIGS. 1A, 7A, it is preferable that the main switch elements Q1, Q3 and the rectifying switch elements Q2, Q4 be formed to the same SOI (Silicon On Insulator) substrate. In such an approach, as compared to where the main switch elements Q1, Q3 and the rectifying switch elements Q2, Q4 are formed to a bulk monocrystalline silicon substrate, the main switch elements Q1, Q3 and the rectifying switch elements Q2, Q4 including the rectifying transistor elements Tr2, Tr4 and the rectifying diode elements Di2, Di4 can be increased in speed and reduced in loss.

Figure 8A:
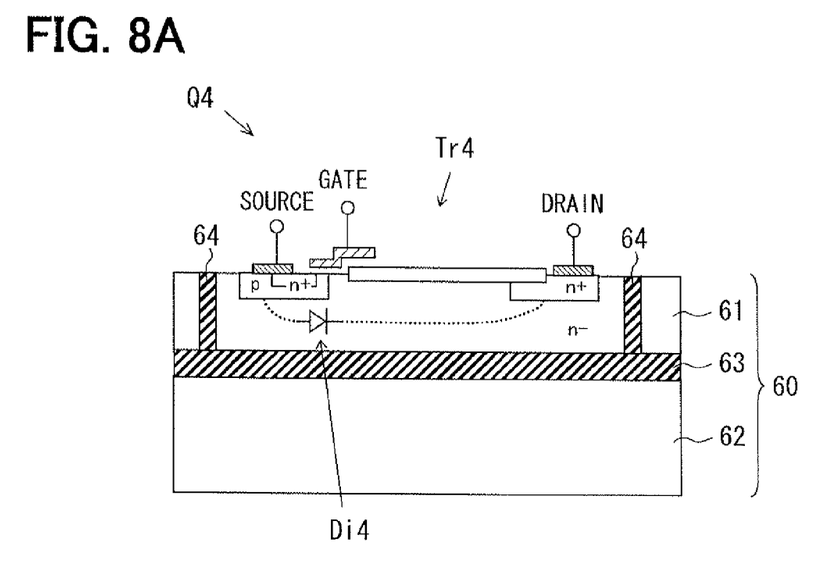
FIG. 8A is a cross-sectional view illustrating a concrete example of a rectifying switch element.
Figure 8B:
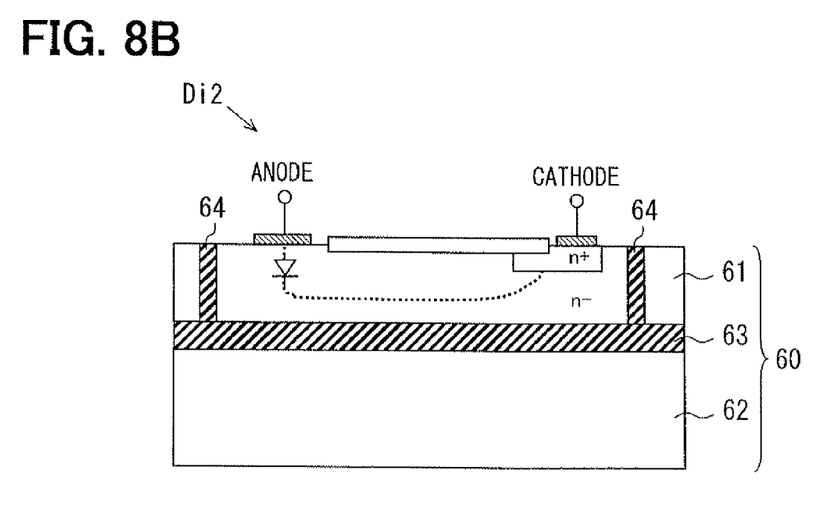
FIG. 8B is a cross-sectional view illustrating a concrete example of a rectifying diode element.

FIGS. 8A, 8B are diagrams illustrating an example of a concrete structure according to a case where the main switch elements Q1, Q3 and the rectifying switch elements Q2, Q4 are formed to the same SOI substrate. FIG. 8A is a cross-sectional view illustrating a concrete example of the rectifying switch element Q4, and FIG. 8B is a cross-sectional view illustrating a concrete example of the rectifying diode element Di2.

Each of the rectifying switch element Q4 shown in FIG. 8A and the rectifying diode element Di2 shown in FIG. 8B is formed to a SOI substrate 60 having a buried oxide film 63. The SOI substrate 60 is formed by using a substrate bonding technique. Elements are formed to a SOI layer 61 on the buried oxide film 63. The SOI layer 61 is polished so that the SOI layer 61 can be thinner than a supporting substrate 62. Further, each of the rectifying switch element Q4 shown in FIG. 8A and the rectifying diode element Di2 shown in FIG. 8B is electrically isolated from neighboring elements by an electrical isolation trench 64 that reaches the buried oxide film 63.

The rectifying switch element Q4 shown in FIG. 8A includes the rectifying transistor element Tr4 formed with a n-channel MOS transistor and the rectifying diode element Di4 formed with a body diode, symbolized in the drawing, inherent in the rectifying transistor element Tr4. The rectifying diode element Di2 shown in FIG. 8B is a Schottky barrier diode. The rectifying transistor element Tr4 and the rectifying diode element Di4 shown in FIG. 8A and the rectifying diode element Di2 shown in FIG. 8B are formed to the thin SOI layer 61. Therefore, as compared to being formed to a bulk monocrystalline silicon substrate, enhancing speed and lowering loss can be achieved.

In this way, the DC-DC converter is configured as a synchronous-rectifier type DC-DC converter that can have a high conversion efficiency and supply a stable DC power without element breakdown even when a sudden input voltage increase occurs or an input voltage remains high for a long time.

Therefore, the DC-DC converter is suitable for use in a vehicle. In particular, by setting the reference value with respect to a load dump surge, the DC-DC converter can supply a stable DC power without element breakdown even when a sudden input voltage increase such as a vehicle load dump occurs or an input voltage remains high for a long time.

The embodiments described above can be modified in various ways. Such changes and modifications are to be understood as being within the scope of the present invention as defined by the appended claims.

What is claimed is:

1. A synchronous-rectifier type DC-DC converter comprising:
a high-side main switch element;
a low-side rectifying switch element including a rectifying transistor element and a rectifying diode element connected in antiparallel with the rectifying transistor element; and
a control drive circuit configured to control an ON/OFF state of the main switch element and the rectifying transistor element, wherein
the control drive circuit detects an input voltage to the main switch element and determines the input voltage or a rate of increase in the input voltage, and
when the determined value exceeds a predetermined reference value, the control drive circuit releases a complementary ON/OFF operation of the main switch element and the rectifying transistor element and sets a state where both the main switch element and the rectifying transistor element are kept OFF for a time period that is longer than a dead-time during the complementary ON/OFF operation.

2. The DC-DC converter according to claim 1, wherein the complementary ON/OFF operation of the main switch element and the rectifying transistor element is released by determining both the input voltage and the rate of increase in the input voltage.

3. The DC-DC converter according to claim 1, wherein under a condition where the determined value exceeds the reference value, the rectifying transistor element is continuously kept OFF.

4. The DC-DC converter according to claim 1, wherein under a condition where the determined value exceeds the reference value, a pulse width of an ON-signal for the rectifying transistor element is unchanged from before the release, and a repetition cycle of the ON-signal for the rectifying transistor element is slower than before the release.

5. The DC-DC converter according to claim 1, wherein under a condition where the determined value exceeds the reference value, a pulse width of an ON-signal for the main switch element is unchanged from before the release, and a repetition cycle of the ON-signal for the main switch element is slower than before the release.

6. The DC-DC converter according to claim 1, wherein under a condition where the determined value exceeds the reference value, a switching speed of each of the main switch element and the rectifying transistor element is lower than before the release.

7. The DC-DC converter according to claim 1, wherein the input voltage or the rate of increase in the input voltage is determined by a software computing of a digital circuit.

8. The DC-DC converter according to claim 1, wherein the input voltage or the rate of increase in the input voltage is determined by an electronic circuit.

9. The DC-DC converter according to claim 1, wherein the rectifying diode element is a Schottky barrier diode.

10. The DC-DC converter according to claim 1, wherein the rectifying transistor element is a MOS transistor element;
the rectifying diode element is a body diode element, and the MOS transistor element and the body diode element are formed to the same semiconductor substrate.

11. The DC-DC converter according to claim 10, wherein an electric current flowing through the main switch element is detected.

12. The DC-DC converter according to claim 1, wherein the main switch element and the rectifying switch element are formed to the same SOI substrate.

13. The DC-DC converter according to claim 1, wherein the DC-DC converter is for use in a vehicle.

14. The DC-DC converter according to claim 13, wherein the reference value is set with respect to a load dump surge.

15. A synchronous-rectifier type DC-DC converter comprising:
- a high-side main switch element;
- a low-side rectifying switch element including a rectifying transistor element and a rectifying diode element connected in antiparallel with the rectifying transistor element; and
- a control drive circuit section configured to control an ON/OFF state of the main switch element and the rectifying transistor element, wherein
- the control drive circuit section detects an input voltage to the main switch element and determines the input voltage or a rate of increase in the input voltage,
- when the determined value exceeds a predetermined reference value, the control drive circuit section releases a complementary ON/OFF operation of the main switch element and the rectifying transistor element and sets a state where both the main switch element and the rectifying transistor element are kept OFF for a time period that is longer than a dead-time during the complementary ON/OFF operation, and
- under a condition where the determined value exceeds the reference value, a pulse width of an ON-signal for the main switch element is unchanged from before the release, and a repetition cycle of the ON-signal for the main switch element is slower than before the release.

16. The DC-DC converter according to claim 15, wherein the complementary ON/OFF operation of the main switch element and the rectifying transistor element is released by determining both the input voltage and the rate of increase in the input voltage.

17. The DC-DC converter according to claim 15, wherein under the condition where the determined value exceeds the reference value, the rectifying transistor element is kept OFF.

18. The DC-DC converter according to claim 15, wherein under the condition where the determined value exceeds the reference value, switching speeds of the main switch element and the rectifying transistor element are lower than before the release.

19. A synchronous-rectifier type DC-DC converter comprising:
- a high-side main switch element;
- a low-side rectifying switch element including a rectifying transistor element and a rectifying diode element connected in antiparallel with the rectifying transistor element; and
- a control drive circuit section configured to control an ON/OFF state of the main switch element and the rectifying transistor element, wherein
- the control drive circuit section detects an input voltage to the main switch element and determines the input voltage or a rate of increase in the input voltage,
- when the determined value exceeds a predetermined reference value, the control drive circuit section releases a complementary ON/OFF operation of the main switch element and the rectifying transistor element and sets a state where both the main switch element and the rectifying transistor element are kept OFF for a time period that is longer than a dead-time during the complementary ON/OFF operation, and
- under a condition where the determined value exceeds the reference value, switching speeds of the main switch element and the rectifying transistor element are lower than before the release.

20. The DC-DC converter according to claim 19, wherein the complementary ON/OFF operation of the main switch element and the rectifying transistor element is released by determining both the input voltage and the rate of increase in the input voltage.

21. The DC-DC converter according to claim 19, wherein under the condition where the determined value exceeds the reference value, the rectifying transistor element is kept OFF.

* * * * *